US009499670B2

(12) United States Patent
Pichl et al.

(10) Patent No.: US 9,499,670 B2
(45) Date of Patent: *Nov. 22, 2016

(54) COMPOSITION FOR THE PRODUCTION OF SILICONE RUBBER MATERIALS

(71) Applicant: Nitrochemie Aschau GmbH, Aschau am Inn (DE)

(72) Inventors: Ulrich Pichl, Aschau (DE); Gerhard Schmidt, Muhldorf a. Inn (DE); Theodor Ederer, Zangberg (DE); Thomas Knott, Muhldorf (DE); Karl-Christian Bart, Ampfing (DE); Jorg Lippstreu, Munich (DE)

(73) Assignee: Nitrochemie Aschau GmbH, Aschau am Inn (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/771,828

(22) PCT Filed: Mar. 4, 2014

(86) PCT No.: PCT/EP2014/000539
§ 371 (c)(1),
(2) Date: Sep. 1, 2015

(87) PCT Pub. No.: WO2014/135262
PCT Pub. Date: Sep. 12, 2014

(65) Prior Publication Data
US 2016/0024258 A1    Jan. 28, 2016

(30) Foreign Application Priority Data
Mar. 4, 2013   (EP) ..................... 13001090

(51) Int. Cl.
| | | |
|---|---|---|
| C08G 77/38 | (2006.01) |
| B01J 31/04 | (2006.01) |
| B01J 31/12 | (2006.01) |
| C09D 183/04 | (2006.01) |
| C09J 183/12 | (2006.01) |
| C08L 83/04 | (2006.01) |
| C09D 119/00 | (2006.01) |

(52) U.S. Cl.
CPC ............... *C08G 77/38* (2013.01); *B01J 31/04* (2013.01); *B01J 31/128* (2013.01); *C08L 83/04* (2013.01); *C09D 119/00* (2013.01); *C09D 183/04* (2013.01); *C09J 183/12* (2013.01); *B01J 2231/14* (2013.01); *B01J 2531/23* (2013.01); *B01J 2531/26* (2013.01); *B01J 2531/54* (2013.01)

(58) Field of Classification Search
None
See application file for complete search history.

(56) References Cited

U.S. PATENT DOCUMENTS

| | | | |
|---|---|---|---|
| 2007/0191541 A1 | 8/2007 | Guennouni et al. | |
| 2010/0152373 A1* | 6/2010 | Wakabayashi | C08G 65/2609 524/588 |
| 2010/0225069 A1* | 9/2010 | Haas | C08K 5/3155 277/591 |
| 2010/0234510 A1* | 9/2010 | Feder | C08K 5/09 524/423 |
| 2012/0016072 A1* | 1/2012 | Ederer | C07F 7/1836 524/588 |

FOREIGN PATENT DOCUMENTS

| | | | |
|---|---|---|---|
| EP | 2280041 | 2/2011 | |
| WO | 2011051092 | 5/2011 | |
| WO | WO 2013101751 A1 * | 7/2013 | ............ C08L 83/04 |

OTHER PUBLICATIONS

Written Opinion of the International Searching Authority; International Application No. PCT/EP2014/000539; Jul. 3, 2014; 6 pages.
International Preliminary Report on Patentability; International Application No. PCT/EP2014/000539; dated Sep. 8, 2015; 6 pages.
International Search Report; International Application No. PCT/EP2014/000539; dated Jul. 3, 2014; 5 pages.
China Patent Office Action, dated May 10, 2016, in App. No. 201480012020.9, with English translation, 12 pages.
China Patent Application No. CN1826375 A and English translation of the Abstract of the priority French application FR2856694; 35 pages.

* cited by examiner

*Primary Examiner* — Robert S Loewe
(74) *Attorney, Agent, or Firm* — Thomas & Karceski, P.C.

(57) ABSTRACT

The present invention relates to a catalyst for the cross-linking of silicone rubber materials. In particular, the present invention provides a composition for the production of a silicone rubber material, wherein the composition comprises a catalyst, which comprises at least two compounds, which are different from each other and which are selected independently of each other from metal salts of carboxylic acids. In addition, the present invention provides a use of the catalyst according to the invention for the cross-linking of a silicone rubber material, as well as a use of the composition according to the invention for the production of a silicone rubber material, especially for the use as a sealant, an adhesive, or a coating agent.

22 Claims, No Drawings

COMPOSITION FOR THE PRODUCTION OF SILICONE RUBBER MATERIALS

CROSS-REFERENCE TO RELATED APPLICATIONS

This is a National Stage Entry into the United States Patent and Trademark Office from International PCT Patent Application No. PCT/EP2014/000539 having an international filing date of Mar. 4, 2014, and European Patent No. 13001090.3 filed Mar. 4, 2013, both of the contents of which are incorporated herein by reference.

The present invention relates to a catalyst for the cross-linking of silicone rubber materials. In particular, the present invention provides a composition for the production of a silicone rubber material, wherein the composition comprises a catalyst, which comprises at least two compounds which are different from each other and which are selected independently of each other from metal salts of carboxylic acids. In addition, the present invention provides a use of the catalyst for the cross-linking of a silicone rubber material, as well as a use of the composition of the present invention for the production of a silicone rubber material, in particular for use as a sealant, an adhesive, or a coating agent.

BACKGROUND OF THE INVENTION

Cold-curing silicone rubber materials, also referred to as "RTV" (from German "Raumtemperatur-vernetzende"=cross-linking at room temperature) silicone rubber materials, have been known for quite some time as custom-designed materials which have elastic properties. They are used, generally, as sealants or adhesives for glass, porcelain, ceramics, stone, plastics, metals, wood, etc., e.g. in applications like joint filling and sealing compounds in construction and sanitary installations, or as coating agents, e.g. in the electronics industry (Röimpp Chemie Lexikon, CD ROM, version 2.0, ed. J. Falbe, Thieme-Verlag, Stuttgart 1999; as well as Ullmanns Enzyklopädie der Technischen Chemie, 4th edition, ed. E. Bartholome, Verlag Chemie, Weinheim 1982, vol. 21, p. 511 et seq.). Use is made especially of single-component RTV silicone rubber materials (RTV-1); These are, for example, plastically mouldable mixtures made of $\alpha,\omega$-dihydroxy-polyorganosiloxanes and appropriate cross-linkers (also referred to as cross-linking agents or hardeners in the art), which are suitable for storing under exclusion of moisture (e.g. within a suitable cartridge) but polymerize under the influence of water or humidity of the air at room temperature. Polymerization, as a rule, takes place by condensation of SiOH groups with appropriate hydrolyzable SiX groups of the cross-linkers.

Depending on the desired chemical and physical properties of the polymerization product, such as, e.g., the desired degree of cross-linking, the solvent resistance, etc., various polyfunctional cross-linkers (hardeners), e.g. tri-funtional and/or tetra-functional cross-linkers (hardeners), are usually used together with various polyorganosiloxanes which either are difunctional or carry more functional groups. The most frequently chosen difunctional polyorganosiloxane compounds are $\alpha,\omega$-dihydroxy-polyorganosiloxanes.

Based on the leaving groups (HX) released by the hydrolyzis of the cross-linker, a distinction is made with RTV-1 silicone rubber materials between acid systems (HX=acids, such as, e.g., acetic acid, etc.), basic systems (e.g. HX=amines, etc.), and neutral systems (e.g. HX=alcohols, oximes, etc.). RTV-1 silicone rubber materials which are commercially available at this time usually comprise acid systems which hydrolyze with release of acetic acid, or neutral systems which hydrolyze with release of oxime compounds, such as, e.g., butan-2-one oxime (or methyl-ethyl-ketoxime, MEKO, respectively).

For the desired broad application range of the silicone rubber materials, these should adhere to as many surfaces as possible, such as, e.g., to wood, varnished wood, glazed wood, metals, such as steel, aluminium, powder-coated aluminium, glass, plastics, such as polyvinylchloride (PVC), polyamide, concrete, etc. In addition, the silicone rubber materials should be stable in storage within an ordinary cartridge, i.e. their properties should not change in dependence of the storage time; Preferably, both in a cartridge sealed after filling, and in a cartridge that is already opened and/or partially emptied. Finally, the polymerization product obtained after complete cross-linking (cure) of the silicone rubber material should be transparent or clear, respectively.

Apart from the appropriate selection of the actual components of the polymer, such as cross-linker and polyorganosiloxane, for controlling the polymerization rate and/or polymerization degree, a catalyst is usually added, by which important product properties of the silicone rubber materials are influenced, such as, e.g., the skin formation time (i.e. the time, at which a first complete skin is formed on an applied material), the tack free time (i.e. the time, after which the material no longer exhibits tackiness), the complete cure (i.e. the time, at which the polymerization is completed), etc. For example, the following properties are expected from commercial silicone sealing compounds: a skin formation time of 5 to 15 minutes, a tack free time of 15 to 120 minutes, and a complete cure of maximal 7 days upon application with a height of 10 mm. Further information regarding the skin formation time, tack free time and complete cure can be taken, e.g., from the "Praxishandbuch Dichtstoffe" ($3^{rd}$ edition 1990), which has been published by the Industrieverband Dichtstoffe e.V. (IVD).

Up to now, a metalorganic catalyst was used as a catalyst for silicone rubber materials, such as one ordinarily used for polysiloxanes cross-linking by condensation, in particular a catalyst on basis of a tin-organic compound, such as, e.g., an alkyl-tin-carboxylate, especially dibutyl-tin-dilaurate and dioctyl-tin-dilaurate. However, such tin-organic compounds exhibit toxicological properties, which have led to restrictions of their use in commercially available products (cf. EU directive 76/769/EWG of 28.05.2009).

As a replacement, another catalyst, which does not comprise a tin-organic compound, was used for the cross-linking of polysiloxanes in the art so far.

For example, a titanium-based compound can be used as catalyst, as described, e.g., in EP 1 230 298 A1 and EP 2 290 007 A1. However, it is known that a catalyst on basis of a titanium compound can result in yellowing and/or surface tackiness in the products, and has a slow vulcanizing rate, a wanting storage stability, and an incompatibility with current adhesion promoters (coupling agents) on basis of aminosilanes.

Moreover, EP 1 230 298 A1 describes a catalyst on basis of amines and metal salts of tin, zinc, iron, lead, barium, and zirconium, as well as on basis of chelates of tin. This catalyst results in products having a little yellowing, but is a slow catalyst according to EP 2 290 007 A1.

Therefore, EP 2 290 007 A1 proposes a catalyst on basis of metal compounds of the I. and II. main and transition groups, i.e. Li, Na, K, Rb, Cs, Be, Mg, Ca, Sr, Ba, Cu, Ag, Au, Zn, Cd, and Hg, in form of pure carboxylates, which result in a product having an acceptable hardening progress upon addition of an acid co-catalyst in form of an organic or inorganic acid.

EP 2 290 007 A1 describes the use of this catalyst in silicone rubber materials with cross-linkers (hardeners), which hydrolyze with release of acid (acetic acid) or neutral (alcohols or MEKO, respectively) compounds, respectively, in particular by using a catalyst made from a Li carboxylate or from a Sr carboxylate, respectively.

The use of a catalyst on basis of Li, Na, K, Mg, Ca, Sr compounds without an additional simultaneous use of an acid co-catalyst is described in EP 2 280 041 A1. Therein, it is further described that in particular the use of Octasoligem lithium or Octasoligem strontium in combination with alkoxy, acetoxy or oximo RTV-1 results in products having desired properties.

OBJECT OF THE INVENTION

However, the inventors of the present invention have found that it is not possible to use the above-described known tin-free catalysts in combination with known silicone rubber materials, which were optimized by using catalysts on basis of tin-organic compounds, with maintaining the optimized product properties of the silicone rubber materials. A mere replacement of a tin-based catalyst by one of the known tin-free catalysts does not result in a product (RTV-1) having the desired properties. So, it was found that the sealing compounds produced with the known tin-free catalysts have a bad adhesion as well as an insufficient storage stability. In particular with acetate cross-linkers, a deficient complete cure was further observed.

Therefore, it is an object of the invention to provide an improved catalyst for silicone rubber materials, which is not only tin-free, but also maintains all the properties, which are desired for RTV-1, in product compositions, which have been optimized by using catalysts on basis of tin-organic compounds.

The object of the invention is solved by the subject-matter of the independent claims. Preferred embodiments are subject-matter of the dependent claims.

Short Description of the Invention

For solving the above-described object, the present invention provides: a composition for the production of a silicone rubber material, wherein the composition comprises a catalyst, which comprises at least two compounds, which are different from each other and which are selected independently of each other from metal salts of carboxylic acids; a use of the catalyst for cross-linking a silicone rubber material; as well as a use of the composition according to the invention for the production of a silicone rubber material, in particular for use as a sealant, an adhesive, or a coating agent.

By extensive studies, the inventors of the present invention have surprisingly found that the object of the invention can be solved by not using, as a catalyst in a silicone rubber material, a single tin-free single compound, as in the prior art, but a mixture of at least two tin-free compounds having a catalytic action. Such a mixture of single catalysts was not used so far, but provides, apart from the toxicological advantages, the additional advantage that the mixture can be readily adjusted to existing compositions.

In particular, the present invention provides the following means:

(1) A composition, which comprises
at least one organosilicone compound,
at least one cross-linker, and
a catalyst, wherein the catalyst comprises at least two compounds, which are different from each other and which are selected independently of each other from metal salts of carboxylic acids.

(2) A composition, as described under item (1) above, which is characterised in that a metal salt of a carboxylic acid comprises at least one metal cation, which is selected from a cation of bismuth, a cation of calcium, a cation of potassium, a cation of lithium, a cation of magnesium, a cation of sodium, and a cation of zinc.

(3) A composition, as described under items (1) or (2) above, which is characterised in that a metal salt of a carboxylic acid comprises one or more carboxylic acid anions, which are selected from anions of saturated and unsaturated carboxylic acids having six to nineteen carbon atoms, wherein the carboxylic acid comprises a straight-chain or branched hydrocarbon chain.

(4) A composition, as described under items (1) to (3) above, which is characterised by comprising a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, preferably a bismuth salt, a calcium salt, and a sodium salt, each of one or more branched saturated carboxylic acids having six to nineteen carbon atoms.

(5) A composition, as described under item (4) above, which is characterised in that the ratio of the number of zinc atoms of the zinc salt of a carboxylic acid to the number of the metal atoms of the metal salt of a carboxylic acid is from 2:1 to 1:2, preferably from 1.3:1 to 1:1.3.

(6) A composition, as described under items (1) to (5) above, which is characterised by comprising at least one metal salt of a carboxylic acid, which is selected from bismuth-tris(2-ethylhexanoate), Calcium-bis(2-ethylhexanoate), sodium(2-ethylhexanoate), and zinc-bis(2-ethylhexanoate).

(7) A composition, as described under items (1) to (6) above, which is characterised by comprising calcium-bis(2-ethylhexanoate) and zinc-bis(2-ethylhexanoate), preferably in a number ratio of from 1.3:1 to 1:1.3.

(8) A composition, as described under items (1) to (6) above, which is characterised by comprising bismuth-tris(2-ethylhexanoate) and zinc-bis(2-ethylhexanoate), preferably in a number ratio of from 1.3:1 to 1:1.3.

(9) A composition, as described under items (1) to (6) above, which is characterised by comprising sodium(2-ethylhexanoate) and zinc-bis(2-ethylhexanoate), preferably in a number ratio of from 1.3:1 to 1:1.3.

(10) A composition, as described under items (1) to (9) above, which is characterised in that the organosilicone compound comprises an α,ω-dihydroxyl-terminated polyorganosiloxane compound, particularly an α,ω-dihydroxyl-terminated polydialkylsiloxane.

(11) A composition, as described under items (1) to (10) above, which is characterised in that the cross-linker comprises at least one compound, which is selected from the group consisting of silane compounds comprising acid residues, particularly silane compounds having acetate residues, and silane compounds comprising oxime residues, particularly silane compounds having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

(12) A composition, as described under item (11) above, which is characterised in that the cross-linker comprises at least one silane compound with acetate residues and at least one silane compound with alkoxy residues.

(13) A composition, as described under items (1) to (12) above, which is characterised by comprising 40 to 90% by weight of the organosilicone compound, 1 to 15% by weight of the cross-linker, and 0.1 to 5.0% by weight of the catalyst, as described under items (1) to (12) above.

(14) A use of a composition, as described under items (1) to (13) above, for the production of a silicone rubber material, particularly for the use as a sealant, an adhesive, or a coating agent.

(15) Use of a catalyst for cross-linking a silicone rubber material, wherein the catalyst comprises at least two compounds, which are different from each other and which are selected independently of each other from metal salts of carboxylic acids.

(16) A use, as described under item (15) above, which is characterised in that the catalyst comprises a metal salt of a carboxylic acid, which comprises at least one metal cation, which is selected from a cation of bismuth, a cation of calcium, a cation of potassium, a cation of lithium, a cation of magnesium, a cation of sodium, and a cation of zinc.

(17) A use, as described under items (15) or (16) above, which is characterised in that the catalyst comprises a metal salt of a carboxylic acid, which comprises one or more carboxylic acid anions, which are selected from anions of saturated and unsaturated carboxylic acids having six to nineteen carbon atoms, wherein the carboxylic acid comprises a straight-chain or branched hydrocarbon chain.

(18) A use, as described under items (15) to (17) above, which is characterised in that the catalyst comprises a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, each of one or more branched saturated carboxylic acids having six to nineteen carbon atoms.

(19) A use, as described under item (18) above, which is characterised in that the ratio of the number of zinc atoms of the zinc salt of a carboxylic acid to the number of the metal atoms of the metal salt of a carboxylic acid is from 2:1 to 1:2, preferably from 1.3:1 to 1:1.3.

(20) A use, as described under items (15) to (19) above, which is characterised in that the catalyst comprises at least one metal salt of a carboxylic acid, which is selected from bismuth-tris(2-ethylhexanoate), calcium-bis(2-ethylhexanoate), sodium(2-ethylhexanoate), and zinc-bis(2-ethylhexanoate).

(21) A use, as described under items (15) to (20) above, which is characterised in that the catalyst comprises calcium-bis(2-ethylhexanoate) and zinc-bis(2-ethylhexanoate), preferably in a number ratio of from 1.3:1 to 1:1.3.

(22) A use, as described under items (15) to (20) above, which is characterised in that the catalyst comprises bismuth-tris(2-ethylhexanoate) and zinc-bis(2-ethylhexanoate), preferably in a number ratio of from 1.3:1 to 1:1.3.

(23) A use, as described under items (15) to (20) above, which is characterised in that the catalyst comprises sodium (2-ethylhexanoate) and zinc-bis(2-ethylhexanoate), preferably in a number ratio of from 1.3:1 to 1:1.3.

(24) A use, as described under items (15) to (24) above, which is characterised in that the silicone rubber material comprises at least one organosilicone compound, which is an $\alpha,\omega$-dihydroxyl-terminated polyorganosiloxane compound, particularly an $\alpha,\omega$-dihydroxyl-terminated polydialkylsiloxane.

(25) A use, as described under items (15) to (24) above, which is characterised in that the silicone rubber material comprises at least one cross-linker, wherein the cross-linker comprises at least one compound, which is selected from the group consisting of silane compounds comprising acid residues, particularly silane compounds having acetate residues, and silane compounds comprising oxime residues, particularly silane compounds having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

(26) A use, as described under item (25) above, which is characterised in that the cross-linker comprises at least one silane compound with oxime residues, and the catalyst comprises zinc-bis(2-ethylhexanoate) and calcium-bis(2-ethylhexanoate).

(27) A use, as described under item (25) above, which is characterised in that the cross-linker comprises at least one silane compound with acetate residues and/or alkoxy residues, and the catalyst comprises zinc-bis(2-ethylhexanoate) and bismuth-bis(2-ethylhexanoate).

(28) A use, as described under items (15) to (27) above, which is characterised in that 0.1 to 5.0% by weight of the catalyst are used with 40 to 90% by weight of the organosilane compound and 1 to 15% by weight of the cross-linker.

DETAILED DESCRIPTION OF THE INVENTION

The present invention provides a composition, which comprises at least one organosilicone compound, at least one cross-linker, and a catalyst, particularly a catalyst for the cross-linking of silicone rubber materials, which comprises at least two compounds which are different from each other and which are selected independently of each other from metal salts of carboxylic acids. The composition according to the invention can be used for the production of a silicone rubber material.

The present invention uses a catalyst for the cross-linking of silicone rubber materials. The catalyst, which is comprised in the composition according to the invention or which is used in the use according to the invention, respectively, comprises at least two compounds which, are different from each other and which are selected independently of each other from metal salts of carboxylic acids.

Thus, the catalyst, which is comprised in the composition according to the invention or which is used in the use according to the invention, respectively, is a mixture of at least two compounds, which are different from each other, preferably a mixture of two to twenty compounds, which are different from each other, further preferred a mixture of two to eight compounds, which are different from each other, and especially preferred a mixture of two or three compounds, which are different from each other.

Especially preferred, the catalyst comprises exactly two metal salts of carboxylic acids, which are different from each other. These are preferably two metal salts of different metals. Especially preferred, the two metal salts of the carboxylic acids are comprised in the catalyst in a ratio of the numbers of the respective metal atoms (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred about 1:1.

Each one of the compounds comprised in the catalyst is a metal salt of one or more carboxylic acids.

Herein, the term "carboxylic acid" means an organic compound, preferably a hydrocarbon, with at least one carboxyl group —COOH. Preferably, a carboxylic acid comprises a hydrocarbon, which comprises from 1 to 25 carbon atoms, preferably from 5 to 20 carbon atoms, and especially preferred from 6 to 19 carbon atoms. The hydrocarbon of the carboxylic acid may be saturated, unsaturated, or aromatic, or may comprise corresponding bonds. The hydrocarbon of the carboxylic acid may comprise a straight-chain or branched hydrocarbon chain, and/or rings of hydrocarbons and/or suitable heteroatoms. Preferably, the carboxylic acid comprises a saturated hydrocarbon (alkane), which comprises a straight-chain or branched hydrocarbon chain. The carboxylic acid may comprise one or more carboxyl groups, preferably one, two, or three carboxyl groups. Especially preferred are mono-carboxylic acids and di-carboxylic acids. In especially preferred di-carboxylic acids, the two carboxyl groups are bound to adjacent carbon atoms. Especially preferred are mono-carboxylic acids.

An especially preferred carboxylic acid is 2-ethyl-hexanoic acid.

A "metal salt of a carboxylic acid" in the sense of this invention is a compound, which comprises at least one carboxylate anion and at least one metal cation. Therein, carboxylate anion means the anion, which is formed by the deprotonation of a carboxyl group of a carboxylic acid. Thus, a carboxylate anion in the sense of this invention is an organic compound, preferably a hydrocarbon, with at least one carboxylate group —COO$^-$, which may be formed from each of the carbon acids described above. The metal cation is a cation of the respective metal, preferably in an oxidation state, which is stable under the conditions of the application. Accordingly, the metal cation preferably has a positive charge of from +1 to +4, further preferred of +1 or +2 or +3. Examples of a monovalent metal cation are $K^+$, $Li^+$, and $Na^+$. Examples of a divalent metal cation (charge +2) are $Ca^{2+}$, $Mg^{2+}$ and $Zn^{2+}$, and an example for a trivalent metal cation (charge +3) is $Bi^{3+}$. For a charge neutral compound, the charge of the metal cation can be compensated by the number of the monovalently negative charged carboxylate groups in such a manner that the ratio of metal cation to carboxylate group in the metal salt is 1:1, 1:2, 1:3, etc., up to the maximum charge, in dependence of the charge of the metal cation. For example, in the case of mono-carboxylic acids, the ratio of metal to carboxylic acid is 1:1 for monovalent metal cations, 1:2 for divalent metal cations, 1:3 for trivalent metal cations, etc. For dicarboxylic acids having two carboxylate groups, the ratio is adjusted accordingly in such a manner that, for example, the ratio of metal to dicarboxylate may be 1:1 for divalent metal cations, etc. The metal salt may comprise carboxylate anions of a single carboxylic acid, or carboxylate anions of several carboxylic acids, which are different from each other. For example, the metal salt of a divalent metal cation may comprise a carboxylate anion of a first carboxylic acid ($R^1$—COO$^-$) and a carboxylate anion of a second carboxylic acid ($R^2$—COO$^-$), which is different thereof.

Apart from metal cation and carboxylate anion(s), the metal salt of a carboxylic acid may also comprise other components, such as, for example, other anions, which are no carboxylate anions, e.g. halogen anions, nitrate anions, sulfate anions, or the like, or neutral molecules, e.g. solvate molecules, or the like.

According to the invention, the catalyst for the cross-linking of silicone rubber materials, which is comprised in the composition according to the invention or which is used in the use according to the invention, respectively, comprises at least two compounds, which are different from each other and which are selected independently to each other from metal salts of carboxylic acids. Thus, the catalyst may comprise salts of two or more metals, which are different from each other, and/or two or more carboxylic acids, which are different from each other. Preferably, the catalyst comprises salts of at least two metals, which are different from each other.

Especially preferred, the metal salts of the carboxylic acids in the catalyst are present in a ratio of the numbers of the respective metal atoms (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred of about 1:1.

Surprisingly, it was found that a catalyst for the cross-linking of silicone rubber materials, which comprises at least two mutually different metal salts of carboxylic acids according to the definition given previously, causes especially advantageous product properties in the production of silicone rubber materials, particularly RTV-1 silicone rubber materials. The catalyst can be used advantageously, without the need for a co-catalyst.

Especially preferred, the catalyst, which is comprised in the composition according to the invention or which is used in the use according to the invention, respectively, comprises a metal salt of a carboxylic acid of at least one metal cation, which is selected from a cation of bismuth, a cation of calcium, a cation of potassium, a cation of lithium, a cation of magnesium, a cation of sodium, and a cation of zinc.

It was found that mixtures, which comprise a Bi, Ca, K, Li, Mg, Na, and/or Zn cation, provide products having especially advantageous properties. Further preferred are mixtures of salts of carboxylic acids, which comprise a Bi, Ca, K, Li, Mg, Na and/or Zn cation, further preferred mixtures, which comprise a Bi, Ca, Na and/or Zn cation, and especially preferred mixtures, which comprise a Bi, Ca and/or Zn cation.

Especially preferred, the catalyst, which is comprised in the composition according to the invention or which is used in the use according to the invention, respectively, comprises a metal salt of a carboxylic acid, which comprises one or more carboxylic acid anions, which are selected from anions of saturated and unsaturated carboxylic acids having six to nineteen carbon atoms, wherein the carboxylic acid preferably comprises a straight-chain or branched hydrocarbon chain.

It was found that products having especially advantageous properties can so be provided. Further preferred are anions of saturated and unsaturated carboxylic acids having six to ten carbon atoms. Further preferred are anions of saturated carboxylic acids with a branched hydrocarbon chain. Especially preferred are anions of a carboxylic acid with a branched hydrocarbon chain of eight carbon atoms. An especially preferred embodiment of a carboxylic acid is 2-ethylhexanoic acid.

Especially preferred, the catalyst, which is comprised in the composition according to the invention or which is used in the use according to the invention, respectively, comprises a metal salt of a carboxylic acid, which is a zinc salt of one or more branched saturated carboxylic acids having six to nineteen carbon atoms, and a metal salt of a carboxylic acid, which is selected from a bismuth salt, a calcium salt, a potassium salt, a lithium salt, a magnesium salt, and a sodium salt, each of one or more branched saturated carboxylic acids having six to nineteen carbon atoms.

Especially preferred, the metal salts of the carboxylic acids in the catalyst are present in a ratio of the number of the zinc atoms of the zinc salt of a carboxylic acid to the number of the metal atoms of the metal salt of a carboxylic acid (number ratio) of from 2:1 to 1:2, further preferred from 1.3:1 to 1:1.3, further preferred from 5:4 to 4:5, further preferred from 1.2:1 to 1:1.2, still further preferred from 1.1:1 to 1:1.1, and especially preferred about 1:1.

It was found that products having especially advantageous properties can so be provided.

Further preferred, the catalyst, which is comprised in the composition according to the invention or which is used in the use according to the invention, respectively, comprises a metal salt of a carboxylic acid, which is a zinc salt of one or more branched saturated carboxylic acids having six to nineteen carbon atoms, and a metal salt of a carboxylic acid, which is selected from a bismuth salt and a calcium salt, each of one or more branched saturated carboxylic acids having six to nineteen carbon atoms. Especially preferred, the catalyst comprises a zinc salt of a branched carboxylic acid having six to ten carbon atoms in combination with a bismuth salt of a branched carboxylic acid having six to ten carbon atoms and/or a calcium salt of a branched carboxylic acid having six to ten carbon atoms. In an especially preferred embodiment, the catalyst comprises a zinc salt of a branched carboxylic acid having eight carbon atoms in combination with a bismuth salt of a branched carboxylic acid having eight carbon atoms and/or a calcium salt of a branched carboxylic acid having eight carbon atoms.

Especially preferred, the catalyst, which is comprised in the composition according to the invention or which is used in the use according to the invention, respectively, comprises zinc-bis(2-ethylhexanoate). It was found that products having especially advantageous properties can be provided with zinc-bis(2-ethylhexanoate).

Especially preferred, the catalyst, which is comprised in the composition according to the invention or which is used in the use according to the invention, respectively, comprises bismuth-tris(2-ethylhexanoate). It was found that products having especially advantageous properties can be provided with bismuth-tris(2-ethylhexanoate).

Especially preferred, the catalyst, which is comprised in the composition according to the invention or which is used in the use according to the invention, respectively, comprises calcium-bis(2-ethylhexanoate). It was found that products having especially advantageous properties can be provided with calcium-bis(2-ethylhexanoate).

Especially preferred, the catalyst, which is comprised in the composition according to the invention or which is used in the use according to the invention, respectively, comprises sodium (2-ethylhexanoate). It was found that products having especially advantageous properties can be provided with sodium (2-ethylhexanoate).

Especially preferred, the catalyst, which is comprised in the composition according to the invention or which is used in the use according to the invention, respectively, comprises a mixture of calcium-bis(2-ethylhexanoate) and zinc-bis(2-ethylhexanoate). Especially preferred, a catalyst, which comprises calcium-bis(2-ethylhexanoate) and zinc-bis(2-ethylhexanoate), is used together with a oxime cross-linker.

Especially preferred, the catalyst comprises a mixture of calcium-bis(2-ethylhexanoate) and zinc-bis(2-ethylhexanoate) in a ratio of 1:1 to 1:3 (weight ratio), further preferred in a ratio of 1:1 to 1:2, and especially preferred 4:5.

This corresponds to a number ratio of calcium-bis(2-ethylhexanoate) to zinc-bis(2-ethylhexanoate) of about 1.1:1 to 1:2.8, preferably about 1.1:1 to 1:1.9, and especially preferred about 1:1.2.

It was found that products having especially advantageous properties can be provided with a catalyst, which comprises calcium-bis(2-ethylhexanoate) and zinc-bis(2-ethylhexanoate), preferably in the ratio of from 1:1 to 1:3 (weight ratio).

It was found that products having especially advantageous properties can be provided with a catalyst, which comprises calcium-bis(2-ethylhexanoate) and zinc-bis(2-ethylhexanoate), preferably in the ratio of rounded 1:1, particularly from about 1.3:1 to 1:1.3 (number ratios).

Especially preferred, the catalyst, which is comprised in the composition according to the invention or which is used in the use according to the invention, respectively, comprises a mixture of sodium(2-ethylhexanoate) and zinc-bis(2-ethylhexanoate). Especially preferred, a catalyst, which comprises sodium(2-ethylhexanoate) and zinc-bis(2-ethylhexanoate), is used together with an oxime cross-linker.

Especially preferred, the catalyst comprises a mixture of sodium(2-ethylhexanoate) and zinc-bis(2-ethylhexanoate) in a ratio of 4:1 to 1:4 (weight ratio), further preferred in a ratio of 1:1 to 1:3, and especially preferred 1:2.

This corresponds to a number ratio of sodium(2-ethylhexanoate) to zinc-bis(2-ethylhexanoate) of about 8.5:1 to 1:1.9, preferably about 2.1:1 to 1:1.4, and especially preferred about 1:1.1.

It was found that products having especially advantageous properties can be provided with a catalyst, which comprises sodium(2-ethylhexanoate) and zinc-bis(2-ethylhexanoate), preferably in the ratio of from 4:1 to 1:4 (weight ratio).

It was found that products having especially advantageous properties can be provided with a catalyst, which comprises sodium(2-ethylhexanoate) and zinc-bis(2-ethylhexanoate), preferably in the ratio of rounded 1:1, particularly from about 1.3:1 to 1:1.3 (number ratios).

Especially preferred, the catalyst, which is comprised in the composition according to the invention or which is used in the use according to the invention, respectively, comprises a mixture of bismuth-tris(2-ethylhexanoate) and zinc-bis(2-ethylhexanoate). Especially preferred, a catalyst, which comprises bismuth-tris(2-ethylhexanoate) and zinc-bis(2-ethylhexanoate), is used together with an acetate cross-linker and/or an alkoxy cross-linker.

Especially preferred, the catalyst comprises a mixture of bismuth-tris(2-ethylhexanoate) and zinc-bis(2-ethylhexanoate) in a ratio of 4:1 to 1:4 (weight ratio), further preferred in a ratio of 2:1 to 3:2, and especially preferred 7:3.

This corresponds to a number ratio of bismuth-tris(2-ethylhexanoate) to zinc-bis(2-ethylhexanoate) of about 2.2:1 to 1:7.3, preferably about 1.1:1 to 1:1.7, and especially preferred about 1.3:1.

It was found that products having especially advantageous properties can be provided with a catalyst, which comprises bismuth-tris(2-ethylhexanoate) and zinc-bis(2-ethylhexanoate), preferably in the ratio of from 4:1 to 1:4 (weight ratio).

It was found that products having especially advantageous properties can be provided with a catalyst, which comprises bismuth-tris(2-ethylhexanoate) and zinc-bis(2-ethylhexanoate), preferably in the ratio of rounded 1:1, particularly from about 1.3:1 to 1:1.3 (number ratios).

A composition according to the invention comprises at least one organosilicone compound, preferably two, three or more different organosilicone compounds. A organosilicone compound comprised in the composition is preferably an oligomeric or polymeric compound. The polymeric organosilicone compound is preferably a difunctional polyorganosiloxane compound, especially preferred an α,ω-dihydroxyl-terminated polyorganosiloxane. More especially preferred are α,ω-dihydroxyl-terminated polydiorganosiloxanes, particularly α,ω-dihydroxyl-terminated polydialkylsiloxanes, α,ω-dihydroxyl-terminated polydialkenylsiloxanes, or α,ω-dihydroxyl-terminated polydiarylsiloxanes. Apart from homopolymeric α,ω-dihydroxyl-terminated polydiorganosiloxanes, heteropolymeric α,ω-dihydroxyl-terminated polydiorganosiloxanes having different organic substituents may also be used, which comprise both copolymers of monomers with similar organic substituents on one silicon atom, and copolymers of monomers with different organic substituents on one silicon atom, e.g. those with mixed alkyl, alkenyl and/or aryl substituents. The preferred organic substituents comprise straight-chain and branched alkyl groups with 1 to 8 carbon atoms, particularly methyl, ethyl, n-propyl and iso-propyl, and n-butyl, sec-butyl, and tert-butyl, vinyl, and phenyl. Therein, single or all hydrogen atoms bound to a carbon atom in the individual organic substituents may be substituted by usual substituents, such as halogen atoms or functional groups such as hydroxyl and/or amino groups. Thus, α,ω-dihydroxyl-terminated polydiorganosiloxanes with partly fuorinated or perfluorated organic substituents may be used, or α,ω-dihydroxyl-terminated polydiorganosiloxanes with organic substituents, which are substituted by hydroxyl and/or amino groups, on the silicon atoms.

Especially preferred examples of an organosilicone compound are α,ω-dihydroxyl-terminated polydialkylsiloxanes, such as, e.g., α,ω-dihydroxyl-terminated polydimethylsiloxanes, α,ω-dihydroxyl-terminated polydiethylsiloxanes, or α,ω-dihydroxyl-terminated polydivinylsiloxanes, as well as α,ω-dihydroxyl-terminated polydiarylsiloxanes, such as, e.g., α,ω-dihydroxyl-terminated polydiphenylsiloxanes. Thereby, polyorganosiloxanes are preferred, which have a kinematic viscosity of from 5000 to 120000 cSt (at 25° C.), particularly those having a viscosity of from 20000 to 100000 cSt, and especially preferred those having a viscosity of from 40000 to 90000 cSt.

Mixtures of polydiorganosiloxanes having different viscosities may also be used.

A composition according to the invention comprises at least one cross-linker. Any known cross-linker may be used. Preferred are cross-linkers on basis of silane compounds with hydrolyzable acetate residues and/or cross-linkers on basis of silane compounds with hydrolyzable oxime residues. Apart from the hydrolyzable acetate and/or oxime groups, the cross-linkers may comprise non-hydrolyzable residues, such as, for example, alkyl groups, alkenyl groups, alkinyl groups, aryl groups, and the like. Preferred non-hydrolyzable residues are methyl, ethyl, propyl, isopropyl, isobutyl, vinyl, phenyl, and the like. The silane compound used as cross-linker preferably has the general formula $SiX_nY_{(4-n)}$, wherein X designates the hydrolyzable residues and Y designates the non-hydrolyzable residues, and n is an integer from 1 to 4. Preferably, a cross-linker comprises three (n=3) or four (n=4) hydrolyzable groups.

Preferably, the cross-linker is selected from silane compounds, which comprise acid residues, particularly silane compounds having acetate residues, and silane compounds, which comprise oxime residues, particularly silane compounds having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

Examples of preferred acetate cross-linkers comprise methyl-triacetoxysilane, ethyl-triacetoxysilane, propyl-triacetoxysilane, vinyl-triacetoxysilane, phenyl-triacetoxysilane, tetraacetoxysilane, and the like.

The acetate cross-linkers may be used as single compounds, or as a mixture of two or more acetate cross-linkers.

Apart from mixtures, which only consist of acetate cross-linkers, mixtures of cross-linkers may also be used, which additionally comprise cross-linkers on basis of silane compounds with hydrolyzable alkoxy groups. Cross-linkers on basis of silane compounds with hydrolyzable alkoxy groups are composed comparably to the acetate cross-linkers, wherein each acetoxy group is replaced by an alkoxy group. Alkoxy cross-linkers release upon hydrolyzis or polymerization (polycondensation), respectively, neutral alcohol molecules. Examples of preferred alkoxy groups are methoxy, ethoxy, propoxy, and the like. Examples of preferred alkoxy cross-linkers comprise methyltrimethoxysilane, ethyltrimethoxysilane, propyltrimethoxysilane, vinyltrimethoxysilane, phenyltrimethoxysilane, methyltriethoxysilane, ethyltriethoxysilane, propyltriethoxysilane, vinyltriethoxysilane, phenyltriethoxysilane, and the like.

Examples of preferred oxime cross-linkers comprise methyl-tris(acetonoximo)silane, ethyl-tris(acetonoximo)silane, propyl-tris(acetonoximo)silane, vinyl-tris(acetonoximo)silane, phenyl-tris(acetonoximo)silane, tetra(acetonoximo)silane, methyl-tris(methyl-ethyl-ketoximo)silane, ethyl-tris(methyl-ethyl-ketoximo)silane, propyl-tris(methyl-ethyl-ketoximo)silane, vinyl-tris(methyl-ethyl-ketoximo)silane, phenyl-tris(methyl-ethyl-ketoximo)silane, tetra(methyl-ethyl-ketoximo)silane, methyl-tris(methyl-propyl-ketoximo)silane, ethyl-tris(methyl-propyl-ketoximo)silane, propyl-tris(methyl-propyl-ketoximo)silane, vinyl-tris(methyl-propyl-ketoximo)silane, phenyl-tris(methyl-propyl-ketoximo)silane, tetra(methyl-propyl-ketoximo)silane, methyl-tris(methyl-isopropyl-ketoximo)silane, ethyl-tris(methyl-isopropyl-ketoximo)silane, propyl-tris(methyl-isopropyl-ketoximo)silane, vinyl-tris(methyl-isopropyl-ketoximo)silane, phenyl-tris(methyl-isopropyl-ketoximo)silane, tetra(methyl-isopropyl-ketoximo)silane, methyl-tris(methyl-isobutyl-ketoximo)silane, ethyl-tris(methyl-isobutyl-ketoximo)silane, propyl-tris(methyl-isobutyl-ketoximo)silane, vinyl-tris(methyl-isobutyl-ketoximo)silane, phenyl-tris(methyl-isobutyl-ketoximo)silane, tetra(methyl-isobutyl-ketoximo)silane, and the like.

The oxime cross-linkers may be used as a single compounds, or as a mixture of two or more oxime cross-linkers.

It was found that the composition may be stored for periods of more than 12 months under exclusion of moisture, and that it polymerizes under the influence of water or humidity of the air at room temperature.

Especially preferred, a composition according to the invention, which comprises acetate cross-linkers, comprises a catalyst, which comprises bismuth-tris(2-ethylhexanoate)

and zinc-bis(2-ethylhexanoate). Especially preferred, a composition according to the invention, which comprises oxime cross-linkers, comprises a catalyst, which comprises calcium-bis(2-ethylhexanoate) and zinc-bis(2-ethylhexanoate), or a catalyst, which comprises sodium(2-ethylhexanoate) and zinc-bis(2-ethylhexanoate).

In the presence of water or humidity of the air, the components cross-linker (hardener) and organosilicone compound of the composition according to the invention polymerize or condense, respectively, to silicone rubber materials by forming Si—O—Si bonds. The polymerization products, which are produced by using the composition according to the invention, are free of specks and spots, transparent, and clear. Thus, the composition according to the invention can be used as sealant, adhesive, coating agent, or the like.

Especially preferred, the composition according to the invention comprises 40 to 90% by weight of the organosilicone compound, 1 to 15% by weight of the cross-linker, and 0.1 to 5.0% by weight of the catalyst, further preferred 0.5 to 2.0% by weight of the catalyst, wherein the remainder is made up by usual additives.

If desired, the composition according to the invention may comprise further usual additives. Usual additives are fillers, colorants, softeners, thixotropic agents, wetting agents, adhesion promoters, catalysts, and others.

Both reinforcing as well as non-reinforcing fillers may be used as fillers. The preferred fillers are inorganic fillers, for instance, highly disperse, pyrogenic, or precipitated silicic acids, carbon black, quartz powder, chalk, or metal salts or metal oxides, such as e.g. titanium oxides. An especially preferred filler is a highly disperse silicic acid, for example, a commercial filler obtainable from Cabot under the name of Cabosil 150. Fillers like highly disperse silicic acids, especially pyrogenic silicic acids, are also useful as thixotropic agents. Metal oxides are useful also as colorants; titanium oxides, for example, as a white colorant. Moreover, the fillers may be surface modified by known methods, for example, silicic acids made hydrophobic with silanes can be used.

Suitable softeners are per se known polydiorganosiloxanes without functional terminal groups, which are therefore different from the organosilicone compounds used according to the invention. And/or liquid aliphatic or aromatic hydrocarbons may be used, preferably those having molecular weights from about 50 to about 5000, whose volatility is low and which are sufficiently compatible with polysiloxanes. The preferred kinematic viscosity of softeners is from 1 to 5000 cSt (at 25° C.), in particular from 50 to 500 cSt, especially preferred being from 90 to 200 cSt. Examples of softeners comprise polydimethylsiloxanes having a viscosity of from 90 to 120 cSt, especially of 100 cSt, paraffin oils, and polysubstituted alkylbenzenes.

The preferred wetting agents and/or adhesion promoters (coupling agents) used are per se known silane compounds with organic substituents carrying reactive groups on the silicon atom, which differ from the organosilicone compounds used according to the invention, such as e.g. organosilanes having reactive amine groups, carboxylic acid groups, epoxy groups, or thiol groups. Among the preferred examples there are aminosilanes, such as aminoethyl-aminopropyl-trialkoxysilane. Concrete examples of especially preferred adhesion promoters (coupling agents) are 3-aminopropyl-triethoxysilane, 3-aminopropyl-trimethoxysilane, aminoethyl-aminopropyl-trimethoxysilane, butylaminopropyl-triethoxysilane, butylaminopropyl-trimethoxysilane, propylaminopropyl-triethoxysilane, propylaminopropyl-trimethoxysilane, N-cyclohexyl-3-aminopropyl-trimethoxysilane, N-cyclohexyl-3-aminopropyl-triethoxysilane, and co-oligomeric diamino/alkyl functional silanes, which is commercially available as Dynasylan 1146 from Degussa. Other oligomeric coupling agents also may be used.

In another aspect, the present invention provides a use of the composition according to the invention as sealant, adhesive, coating agent, or the like. The composition finds preferred application in the construction sector, specifically as a sealant or adhesive, especially for joints in buildings and civil engineering projects, for glass elements and windows (preferred) and in sanitary installations. Mechanical engineering likewise is open for use of the composition, e.g. the motor vehicle sector (preferred), electronics and textile industries, and industrial plants and installations.

According to the desired application, the composition according to the invention as a RTV silicone rubber material can be applied to any substrate, where the composition then polymerizes at room temperature under the influence of water or humidity of the air. For example, in the use thereof as a sealant, the composition according to the invention is introduced into a joint to be sealed or the like. In the use of the composition according to the invention as an adhesive, the composition is applied to one or both of the parts to be connected, and those are then joined. The composition according to the invention is distinguished by an excellent adhesion to all important materials, such as, for example, wood, varnished wood, glazed wood, aluminium, powder-coated aluminium, glass, PVC, polyamide, steel, concrete, and many other materials. The obtained polymer is transparent, and has an advantageous elasticity and hardness. Moreover, the composition according to the invention is distinguished by a short skin formation time, tack free time, and early strain. In addition, the composition according to the invention has advantageous storage properties within the cartridge.

In another aspect, the present invention provides a use of a catalyst for cross-linking a silicone rubber material, wherein the catalyst comprises at least two compounds, which are different from each other and which are selected independently of each other from metal salts of carboxylic acids.

The catalyst used in the use according to the invention has been described in detail above.

Preferably, a catalyst is used, which comprises at least one metal salt of a carboxylic acid, which is selected from bismuth-tris(2-ethylhexanoate), calcium-bis(2-ethylhexanoate), sodium(2-ethylhexanoate), and zinc-bis(2-ethylhexanoate).

Especially preferred, the catalyst used comprises calcium-bis(2-ethylhexanoate) and zinc-bis(2-ethylhexanoate), preferably in a number ratio of from 1.3:1 to 1:1.3.

Especially preferred, a catalyst, which comprises calcium-bis(2-ethylhexanoate) and zinc-bis(2-ethylhexanoate), is used together with an oxime cross-linker.

Especially preferred, the catalyst used comprises bismuth-tris(2-ethylhexanoate) and zinc-bis(2-ethylhexanoate), preferably in a number ratio of from 1.3:1 to 1:1.3.

Especially preferred, a catalyst, which comprises bismuth-tris(2-ethylhexanoate) and zinc-bis(2-ethylhexanoate), is used together with an acetate cross-linker.

Especially preferred, the catalyst used comprises sodium(2-ethylhexanoate) and zinc-bis(2-ethylhexanoate), preferably in a number ratio of from 1.3:1 to 1:1.3.

Especially preferred, a catalyst, which comprises sodium(2-ethylhexanoate) and zinc-bis(2-ethylhexanoate), is used together with an oxime cross-linker.

Especially preferred, the catalyst is used for cross-linking a silicone rubber material, which comprises at least one organosilicone compound and at least one cross-linker, wherein the compounds described above are preferably used as the at least one organosilicone compound and the at least one cross-linker.

Especially preferred, the organosilicone compound used comprises an α,ω-dihydroxyl-terminated polyorganosiloxane compound, particularly an α,ω-dihydroxyl-terminated polydialkylsiloxane.

Especially preferred, the cross-linker used comprises at least one compound, which is selected from the group that consists of silane compounds, which comprise acid residues, particularly silane compound having acetate residues, and silane compounds, which comprise oxime residues, particularly silane compound having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

Especially preferred, 0.1 to 5.0% by weight of the catalyst are used with 40 to 90% by weight of the organosilicone compound and 1 to 15% by weight of the cross-linker.

By the inventive use of the described catalyst, a cross-linking of a silicone rubber material can be advantageously controlled according to the desired application in such a manner that polymerization products having desired properties are formed.

EXAMPLES

In the examples and comparative examples, the following metal salts of carboxylic acids are used, which are available from different suppliers, such as, for example, from Gelest (Morrisville, USA). The sodium salt and the potassium salt of 2-ethylhexanoic acid were obtained from Alfa Aesar GmbH & Co. KG, Karlsruhe, Germany.

As bismuth salt of carboxylic acids, bismuth-tris(2-ethylhexanoate) is used, which is classified under the CAS-No. 67874-71-9.

As calcium salt of carboxylic acids, calcium-bis(2-ethylhexanoate) is used, which is classified under the CAS-No. 68409-80-3.

As potassium salt of carboxylic acids, potassium (2-ethylhexanoate) is used, which is classified under the CAS-No. 3164-85-0.

As lithium salt of carboxylic acids, lithium (2-ethylhexanoate) is used, which is classified under the CAS-No. 15590-62-2.

As sodium salt of carboxylic acids, sodium (2-ethylhexanoate) is used, which is classified under the CAS-No. 19766-89-3.

As strontium salt of carboxylic acids, strontium-bis(2-ethylhexanoate) is used, which is classified under the CAS-No. 2457-02-5.

As zinc salt of carboxylic acids, zinc-bis(2-ethylhexanoate) is used, which is classified under the CAS-No. 85203-81-2.

The further chemicals, which are used in the examples and comparative examples, are obtainable, for example, from the producers named in the following:

Polydimethylsiloxane (800000 cSt) from Wacker Chemie, Burghausen, Germany;

Polymethylsiloxane (100 cSt) from Dow Corning, Seneffe, Belgium;

Filler (highly disperse silicic acid) from Cabot Rheinfelden, Germany;

Aminopropyltriethoxysilane from Nitrochemie Aschau GmbH, Germany;

Coupling agent (co-oligomer on basis of aminoethylaminopropyltrimethoxysilane) from Nitrochemie Aschau GmbH, Germany;

Coupling agent (diacetoxy-di-tert.-butoxysilane) from Nitrochemie Aschau GmbH, Germany;

Mixtures of cross-linkers from Nitrochemie Aschau GmbH, Germany.

Measurement of the Product Properties of the Produced Sealants

The product properties skin formation time, tack free time, early strain, complete cure, appearance, and Shore-hardness A were determined for all sealants produced according to usual methods (cf. e.g. "Praxishandbuch Dichtstoffe" by Industrieverband Dichtstoffe e.V., $3^{rd}$ edition 1990). All measurements were carried out at conditions of 23° C. and 50% humidity.

For the determination of the skin formation time, the time was measured, at which a complete layer of solidified material (skin) was detected on the surface of a sample strand.

For the determination of the tack free time (German: "Klebfreizeit"), the time was measured, at which the surface of a sample strand no longer exhibits tackiness (adherence).

For the determination of the early strain, a silicone strip having a height of 10 mm was applied to a sheet metal strip. The resilience (strain) is tested by bending the strip by 90°. The time is recorded, at which the skin of the silicone strip does not crack.

For the determination of the complete cure, the sealant is applied to a glass plate with a height of 4 mm, and the time period is measured until complete curing to the glass plate.

For the determination of the surface cross-linking (notch strength), a strip of sealing compound having a height of 10 mm is applied to a glass plate. After 24 hours at standard conditions (21 to 25° C.; 40 to 60% humidity), a notch is pressed into the surface. After 10 seconds, it is tested whether the notch is reversible.

Appearance is determined by organo-leptic tests.

The Shore-hardness A was determined using a measuring device "Zwick-Roell-Messgerät" (Bez.: ASTM D 2240; DIN 53505; ISO 868). The respective sample of sealing compound was applied with an application height of 10 mm and kept for 7 days at standard conditions (23° C./50% humidity). The measurement was then carried out after 7 days of storage at standard conditions.

Example 1

Catalyst A

A catalyst according to the invention is produced, which comprises calcium and zinc salts of carboxylic acids.

For catalyst A, calcium-bis(2-ethylhexanoate) and zinc-bis(2-ethylhexanoate) are mixed in a ratio of 4:5 (weight ratio).

Example 2

Catalyst B

A catalyst according to the invention is produced, which comprises bismuth and zinc salts of carboxylic acids.

For catalyst B, bismuth-tris(2-ethylhexanoate) and zinc-bis(2-ethylhexanoate) are mixed in a ratio of 7:3 (weight ratio).

Reference Example 1

A usual tin-containing silicone rubber mixture with oxime cross-linker is produced according to the following formulation:

| | |
|---|---|
| 556.0 g | of α,ω-dihydroxyl-terminated polydimethylsiloxane having a viscosity of 80000 cSt |
| 266.0 g | of polydimethylsiloxane having a viscosity of 100 cSt |
| 109.0 g | of highly disperse silicic acid (filler) |
| 50.5 g | of a cross-linker mixture of 14.5 g of vinyl-tris(ethylmethylketoximo)silane and 36.0 g of methyl-tris(ethylmethylketoximo)silane |
| 18.0 g | of 3-aminopropyltriethoxysilane (thixotrophic agent) |
| 4.0 g | of dibutyltinlaureate as catalyst |

The sealant exhibits after exposure to air:
a skin formation time of 10 min
a tack free time of 30 min
an early strain after 80 min
a complete cure after 24 h (notch strength)
a transparent appearance
a Shore-hardness A of 24
Moreover, it was found that the sealant has a good adhesion to wood, varnished wood, glazed wood, aluminium, powder-coated aluminium, glass, PVC, polyamide, steel, concrete, and many other materials.

Reference example 1 illustrates the product properties of a currently usual tin-containing sealant mixture.

Comparative Example 1

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 3.0 g | of zinc-bis(2-ethylhexanoate) |
| 1.0 g | of 2-ethylhexanoic acid (co-catalyst) |

The sealant exhibits after exposure to air:
a skin formation time of 7 min
a tack free time of 20 min
an early strain after 160 min
a complete cure after 24 h (notch strength)
a transparent appearance
a Shore-hardness A of 22
Moreover, it was found that the sealant has a good adhesion to wood, glazed wood, aluminium, and glass. On the contrary, the adhesion to powder-coated aluminium, PVC, polyamide, steel, and concrete is only moderate to bad.

Further, the sealant has an insufficient storage stability within the cartridge. Already after 4 weeks of storage at 60° C. within the cartridge, the sealant only reaches a Shore-hardness A of 12 after 7 days of cure under exposure to air. Moreover, the sealant only exhibits a moderate to bad adhesion to all substrates.

Comparative Example 2

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 2.9 g | of zinc-bis(2-ethylhexanoate) |
| 1.1 g | of octylphosphonic acid (co-catalyst) |

The sealant exhibits after exposure to air:
a skin formation time of 10 min
a tack free time of 25 min
an early strain after 250 min (not acceptable)
a complete cure after 24 h (notch strength)
a transparent appearance
a Shore-hardness A of 25
Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:
no notch strength after 24 h of exposure to air
Shore-hardness A after 7 days of exposure to air is only 16
yellowing of the sealant Comparative Example 3

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 2.9 g | of strontium-bis(2-ethylhexanoate) |
| 1.1 g | of octylphosphonic acid (co-catalyst) |

The sealant exhibits after exposure to air:
a skin formation time of 13 min
a tack free time of 30 min
an early strain after 360 min (not acceptable)
a complete cure after 24 h (notch strength)

a transparent appearance a Shore-hardness A of 25

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:

no notch strength after 24 h of exposure to air

Shore-hardness A after 7 days of exposure to air is only 17 yellowing of the sealant

Comparative Example 4

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 2.9 g | of lithium(2-ethylhexanoate) |
| 1.1 g | of octylphosphonic acid (co-catalyst) |

The sealant exhibits after exposure to air:

a skin formation time of 13 min a tack free time of 30 min an early strain after 420 min (not acceptable)

a complete cure after 24 h (notch strength)

a transparent appearance a Shore-hardness A of 25

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:

no notch strength after 24 h of exposure to air

Shore-hardness A after 7 days of exposure to air is only 15 yellowing of the sealant

Comparative Example 5

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 4.0 g | of zinc-bis(2-ethylhexanoate) |

The sealant exhibits after exposure to air:

a skin formation time of 5 min a tack free time of 25 min an early strain after 280 min (not acceptable)

a complete cure after 24 h (notch strength)

a transparent appearance a Shore-hardness A of 25

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:

no notch strength after 24 h of exposure to air

Shore-hardness A after 7 days of exposure to air is only 17 yellowing of the sealant

Comparative Example 6

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of 21.0 g of ethyl-tris(acetonoximo)silane, 15.0 g of vinyl-tris(ethylmethylketoximo)silane and 6.0 g of methyl-tris(ethylmethylketoximo)silane |
| 13.0 g | of coupling agent (on basis of aminoethylaminopropyltrimethoxysilane) |
| 4.0 g | of bismuth-tris(2-ethylhexanoate) |

The sealant exhibits after exposure to air:

a skin formation time of 5 min a tack free time of 15 min an early strain after 300 min (not acceptable)

a complete cure after 24 h (notch strength)

a transparent appearance a Shore-hardness A of 25

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:

no notch strength after 24 h of exposure to air
Shore-hardness A after 7 days of exposure to air is only 15
yellowing of the sealant Comparative Example 7

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of |
| | 21.0 g of ethyl-tris(acetonoximo)silane, |
| | 15.0 g of vinyl-tris(ethylmethylketoximo)silane and |
| | 6.0 g of methyl-tris(ethylmethylketoximo)silane |
| 13.0 g | of coupling agent (on basis of aminoethylaminopropyltrimethoxysilane) |
| 4.0 g | of calcium-bis(2-ethylhexanoate) |

The sealant exhibits after exposure to air:
a skin formation time of 5 min
a tack free time of 18 min
an early strain after 320 min (not acceptable)
a complete cure after 24 h (notch strength)
a transparent appearance
a Shore-hardness A of 25

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:
no notch strength after 24 h of exposure to air
Shore-hardness A after 7 days of exposure to air is only 14
yellowing of the sealant Comparative Example 8

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of |
| | 21.0 g of vinyl-tris(ethylmethylketoximo)silane and |
| | 21.0 g of methyl-tris(ethylmethylketoximo)silane |
| 13.0 g | of coupling agent (on basis of aminoethylaminopropyltrimethoxysilane) |
| 2.0 g | of sodium(2-ethylhexanoate) |

The sealant exhibits after exposure to air:
a skin formation time of 8 min
a tack free time of 30 min
a complete cure after 24 h (notch strength)
a transparent appearance
a Shore-hardness A of 23

Moreover, it was found that the sealant has a good adhesion to wood, varnished wood, glazed wood, aluminium, powder-coated aluminium, glass, PVC, polyamide, steel, concrete, etc.

However, the sealant has an insufficient storage stability within the cartridge. Already after 4 weeks of storage at 60° C. within the cartridge, the following parameters have deteriorated:
insufficient adhesion
Shore-hardness A after 7 days of exposure to air is only 5

It is apparent from comparative examples 1 to 8 that, with the known tin-free catalysts, it is not possible to prepare a sealant material with oxime cross-linkers, which has good product properties, which would be comparable to those of a usual tin-containing sealant material (e.g. reference example 1). Particularly, the sealant materials prepared with the known tin-free catalysts have a bad adhesion to many materials as well as an insufficient storage stability.

Example 3

Sealant Formulation 1 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of |
| | 21.0 g of ethyl-tris(ethylmethylketoximo)silane, |
| | 15.0 g of vinyl-tris(ethylmethylketoximo)silane and |
| | 6.0 g of methyl-tris(ethylmethylketoximo)silane |
| 13.0 g | of coupling agent (on basis of aminoethylaminopropyltrimethoxysilane) |
| 2.0 g | of Catalyst A (from Example 1) |

The sealant exhibits after exposure to air:
a skin formation time of 12 min
a tack free time of 23 min
an early strain after 180 min
a complete cure after 24 h (notch strength)
a transparent appearance
a Shore-hardness A of 25

Moreover, it was found that the sealant has a good adhesion to wood, varnished wood, glazed wood, aluminium, powder-coated aluminium, glass, PVC, polyamide, steel, concrete, and many other materials.

Further, the sealant is distinguished by its excellent storage stability within the cartridge. After 4 weeks of storage at 60° C. within the cartridge, the sealant still has the same properties as at the time of the first exposure.

Example 4

Sealant Formulation 2 (with Oxime Cross-Linker)

A silicone rubber mixture is produced according to the following formulation:

| | |
|---|---|
| 525.0 g | of α,ω-dihydroxyl-terminated polydimethylsiloxane having a viscosity of 80000 cSt |
| 313.0 g | of polydimethylsiloxane having a viscosity of 100 cSt |
| 103.0 g | of highly disperse silicic acid (filler) |
| 42.0 g | of a cross-linker mixture of |
| | 21.0 g of vinyl-tris(ethylmethylketoximo)silane and |
| | 21.0 g of methyl-tris(ethylmethylketoximo)silane |
| 13.0 g | of coupling agent (on basis of aminoethylaminopropyltrimethoxysilane) |
| 2.0 g | of Catalyst A (from Example 1) |

The sealant exhibits after exposure to air:
a skin formation time of 10 min
a tack free time of 20 min
an early strain after 140 min
a complete cure after 24 h (notch strength)
a transparent appearance
a Shore-hardness A of 26

Moreover, it was found that the sealant has a good adhesion to wood, varnished wood, glazed wood, aluminium, powder-coated aluminium, glass, PVC, polyamide, steel, concrete, and many other materials.

Further, the sealant is distinguished by its excellent storage stability within the cartridge. After 4 weeks of storage at 60° C. within the cartridge, the sealant still has the same properties as at the time of the first exposure.

Example 5

Sealant Formulation 2 (with Oxime Cross-Linker)

Three exemplary catalysts (A1 to A3) are produced from calcium-bis(2-ethylhexanoate) and zinc-bis(2-ethylhexanoate). The mixing ratio (weight ratio) of calcium-bis(2-ethylhexanoate) to zinc-bis(2-ethylhexanoate) is 1:1 in catalyst A1, 2:3 in catalyst A2, and 1:3 in catalyst A3.

A silicone rubber mixture is produced according to the formulation described in Example 4, wherein 2.0 g of the catalysts A1, A2, and A3 are added in each case instead of 2.0 g of catalyst A.

The sealant exhibits after exposure to air:
a skin formation time of 6 min (A1, A2, A3)
a tack free time of 30 min (A1) or 25 min (A2, A3), respectively
a complete cure after 24 h (A1, A2, A3) (notch strength)
a transparent appearance
a Shore-hardness A of 24 (A1) or 26 (A2, A3), respectively Moreover, it was found that the sealant has a good adhesion to wood, varnished wood, glazed wood, aluminium, powder-coated aluminium, glass, PVC, polyamide, steel, concrete, and many other materials.

Further, the sealant is distinguished by its excellent storage stability within the cartridge. After 4 weeks of storage at 60° C. within the cartridge, the sealant still has the same properties as at the time of the first exposure.

Example 6

Sealant Formulation 2 (with Oxime Cross-Linker)

Three exemplary catalysts (C1 to C3) are produced from sodium (2-ethylhexanoate) and zinc-bis(2-ethylhexanoate). The mixing ratio (weight ratio) of sodium(2-ethylhexanoate) to zinc-bis(2-ethylhexanoate) is 4:1 in catalyst C1, 2:3 in catalyst C2, and 1:4 in catalyst C3.

A silicone rubber mixture is produced according to the formulation described in Example 4, wherein 2.0 g of the catalysts C1, C2, and C3 are added in each case instead of 2.0 g of catalyst A.

The sealant exhibits after exposure to air:
a skin formation time of 6 min (C1, C3) or 7 min (C2), respectively
a tack free time of 25 min (C1, C2, C3)
a complete cure (notch strength) after 24 h (C1, C2, C3)
a transparent appearance
a Shore-hardness A of 24 (C1) or 25 (C2, C3), respectively Moreover, it was found that the sealant has a good adhesion to wood, varnished wood, glazed wood, aluminium, powder-coated aluminium, glass, PVC, polyamide, steel, concrete, and many other materials.

Example 7

Sealant Formulation 2 (with Oxime Cross-Linker)

A silicone rubber mixture is produced according to the formulation described in Example 4, wherein 2.0 g of a catalyst made of potassium(2-ethylhexanoate) and zinc-bis(2-ethylhexanoate) in a ratio of 2:3 is used instead of 2.0 g of catalyst A.

The sealant exhibits after exposure to air:
a skin formation time of 6 min
a tack free time of 25 min
a complete cure after 24 h (notch strength)
a transparent appearance
a Shore-hardness A of 25

Moreover, it was found that the sealant has a good adhesion to wood, varnished wood, glazed wood, aluminium, powder-coated aluminium, glass, PVC, polyamide, steel, concrete, and many other materials.

Example 8

Sealant Formulation 2 (with Oxime Cross-Linker)

A silicone rubber mixture is produced according to the formulation described in Example 4, wherein 2.0 g of a catalyst made of lithium(2-ethylhexanoate) and zinc-bis(2-ethylhexanoate) in a ratio of 2:3 is used instead of 2.0 g of catalyst A.

The sealant exhibits after exposure to air:
a skin formation time of 7 min
a tack free time of 25 min
a complete cure after 24 h (notch strength)
a transparent appearance
a Shore-hardness A of 25

Moreover, it was found that the sealant has a good adhesion to wood, varnished wood, glazed wood, aluminium, powder-coated aluminium, glass, PVC, polyamide, steel, concrete, and many other materials.

In contrast to the sealants produced in the Comparative Examples 1 to 8, the sealants with oxime cross-linkers prepared with the catalyst according to the invention are not only distinguished by excellent product properties, but also by an excellent storage stability. The advantageous effect of the catalyst according to the invention is independent of the composition used, the mixing ratio, and the cross-linkers used. An especially advantageous catalyst comprises calcium-bis(2-ethylhexanoate) and zinc-bis(2-ethylhexanoate). In particular, it was found that the catalyst A causes especially good properties in the produced sealants, particularly in combination with oxime cross-linkers. Moreover, an additional co-catalyst is not required.

Comparative Example 9

Sealant Formulation 3 (with Acetate Cross-Linker)

A silicone rubber mixture is produced according to the following formulation:

| | |
|---|---|
| 562.0 g | of α,ω-dihydroxyl-terminated polydimethylsiloxane having a viscosity of 80000 cSt |
| 313.0 g | of polydimethylsiloxane having a viscosity of 100 cSt |
| 79.0 g | of highly disperse silicic acid (filler) |
| 40.0 g | of a cross-linker mixture of |
| | 28.0 g of propyl-triacetoxysilane, and |
| | 12.0 g of ethyl-triacetoxysilane |
| 5.0 g | of coupling agent (diacetoxy-di-tert.-butoxysilane) |
| 2.9 g | of zinc-bis(2-ethylhexanoate) |
| 1.1 g | of octylphosphonic acid (co-catalyst) |

The sealant exhibits after exposure to air:
a skin formation time of 11 min
a tack free time of 75 min
an early strain after 30 min
a complete cure after 24 h (notch strength)
a transparent appearance
a Shore-hardness A of 23

Moreover, it was found that the sealant has a good adhesion to wood, varnished wood, glazed wood, aluminium, glass, polyamide, steel, etc.

However, the sealant has an insufficient storage stability within the cartridge. Already after 8 weeks of storage at room temperature within the cartridge, the following parameters have deteriorated:
tack free time: 420 min
no notch strength after 24 h in air
an early strain after 90 min Comparative Example 10

Sealant Formulation 3 (with Acetate Cross-Linker)

A silicone rubber mixture is produced according to the following formulation:

| | |
|---|---|
| 562.0 g | of α,ω-dihydroxyl-terminated polydimethylsiloxane having a viscosity of 80000 cSt |
| 313.0 g | of polydimethylsiloxane having a viscosity of 100 cSt |
| 79.0 g | of highly disperse silicic acid (filler) |
| 40.0 g | of a cross-linker mixture of |
| | 28.0 g of propyl-triacetoxysilane, and |
| | 12.0 g of ethyl-triacetoxysilane |
| 5.0 g | of coupling agent (diacetoxy-di-tert.-butoxysilane) |
| 4.0 g | of zinc-bis(2-ethylhexanoate) |

The sealant exhibits after exposure to air:
a skin formation time of 11 min
a tack free time of more than five hours
an early strain after more than five hours
no complete cure after 24 h (notch strength)
a transparent appearance
a Shore-hardness A of 22

Moreover, it was found that the sealant has a good adhesion to aluminium, glass, polyamide, steel, etc.

However, the adhesion to wood, varnished wood, and glazed wood is only bad.

Further, the sealant has an insufficient storage stability within the cartridge. Already after 4 weeks of storage at 60° C. within the cartridge, the following parameters have deteriorated:
tack free time: more than 48 hours
no notch strength after 48 h in air
an early strain after more than 48 h
Shore-hardness A after 7 days on air is only just 15

Comparative Example 11

Sealant Formulation 3 (with Acetate Cross-Linker)

A silicone rubber mixture is produced according to the following formulation:

| | |
|---|---|
| 562.0 g | of α,ω-dihydroxyl-terminated polydimethylsiloxane having a viscosity of 80000 cSt |
| 313.0 g | of polydimethylsiloxane having a viscosity of 100 cSt |
| 79.0 g | of highly disperse silicic acid (filler) |
| 40.0 g | of a cross-linker mixture of |
| | 28.0 g of propyl-triacetoxysilane, and |
| | 12.0 g of ethyl-triacetoxysilane |
| 5.0 g | of coupling agent (diacetoxy-di-tert.-butoxysilane) |
| 4.0 g | of bismuth-tris(2-ethylhexanoate) |

The sealant exhibits after exposure to air:
a skin formation time of 7 min
a tack free time of more than 5 hours
an early strain after more than 5 hours
no complete cure after 24 h (notch strength)
a transparent appearance
a Shore-hardness A of 21

Moreover, it was found that the sealant has a good adhesion to aluminium, glass, polyamide, steel, etc.

However, the adhesion to wood, varnished wood, and glazed wood is only bad.

Further, the sealant has an insufficient storage stability within the cartridge. Already after 4 weeks of storage at 60° C. within the cartridge, the following parameters have deteriorated:
tack free time: more than 48 hours
no notch strength after 48 h in air
an early strain after more than 48 h
Shore-hardness A after 7 days on air is only just 14

Comparative Example 12

Sealant Formulation 3 (with Acetate Cross-Linker)

A silicone rubber mixture is produced according to the following formulation:

| | |
|---|---|
| 562.0 g | of α,ω-dihydroxyl-terminated polydimethylsiloxane having a viscosity of 80000 cSt |
| 313.0 g | of polydimethylsiloxane having a viscosity of 100 cSt |
| 79.0 g | of highly disperse silicic acid (filler) |
| 40.0 g | of a cross-linker mixture of |
| | 28.0 g of propyl-triacetoxysilane, and |
| | 12.0 g of ethyl-triacetoxysilane |
| 5.0 g | of coupling agent (diacetoxy-di-tert.-butoxysilane) |
| 4.0 g | of calcium-bis(2-ethylhexanoate) |

The sealant exhibits after exposure to air:
a skin formation time of 9 min
a tack free time of more than 5 hours
an early strain after more than 5 hours
no complete cure after 24 h (notch strength)
a transparent appearance
a Shore-hardness A of 23

Moreover, it was found that the sealant has a good adhesion to aluminium, glass, polyamide, steel, etc.

However, the adhesion to wood, varnished wood, and glazed wood is only bad.

Further, the sealant has an insufficient storage stability within the cartridge. Already after 4 weeks of storage at 60° C. within the cartridge, the following parameters have deteriorated:

tack free time: more than 48 hours
no notch strength after 48 h in air
an early strain after more than 48 h
Shore-hardness A after 7 days on air is only just 12

Comparative Example 13

Sealant Formulation 4 (with Acetate and Alkoxy Cross-Linker)

A silicone rubber mixture is produced according to the following formulation:

| | |
|---|---|
| 555.0 g | of α,ω-dihydroxyl-terminated polydimethylsiloxane having a viscosity of 80000 cSt |
| 312.0 g | of polydimethylsiloxane having a viscosity of 100 cSt |
| 84.0 g | of highly disperse silicic acid (filler) |
| 45.0 g | of a cross-linker mixture of |
| | 31.5 g of methyl-triacetoxysilane, |
| | 9.0 g of propyl-triacetoxysilane, and |
| | 4.5 g of methyl-trimethoxysilane |
| 2.5 g | of coupling agent (diacetoxy-di-tert.-butoxysilane) |
| 4.0 g | of lithium(2-ethylhexanoate) |

The sealant exhibits after exposure to air:
a skin formation time of 6 min
a tack free time of 30 min
a complete cure after 24 h (notch strength)
a transparent appearance
a Shore-hardness A of 16
Moreover, it was found that the sealant only has a moderate adhesion to wood, varnished wood, glazed wood, aluminium, powder-coated aluminium, glass, PVC, polyamide, steel, concrete, and many other materials.
Further, the sealant has an insufficient storage stability within the cartridge. Already after 4 weeks of storage at 60° C. within the cartridge, no complete cure occurs any more. Accordingly, no adhesion to substrates is observed.

Comparative Example 14

Sealant Formulation 4 (with Acetate and Alkoxy Cross-Linker)

A silicone rubber mixture is produced according to the formulation described in Comparative Example 13, wherein 4.0 g of sodium(2-ethylhexanoate) are used as catalyst instead of 4.0 g of lithium(2-ethylhexanoate).
The sealant exhibits after exposure to air:
a skin formation time of 6 min
a tack free time of 28 min
a complete cure after 24 h (notch strength)
a transparent appearance
a Shore-hardness A of 1
Moreover, it was found that the sealant only has a moderate adhesion to wood, varnished wood, glazed wood, aluminium, powder-coated aluminium, glass, PVC, polyamide, steel, concrete, and many other materials.
Further, the sealant has an insufficient storage stability within the cartridge. Already after 4 weeks of storage at 60° C. within the cartridge, no complete cure occurs any more. Accordingly, no adhesion to substrates is observed.

Comparative Example 15

Sealant Formulation 4 (with Acetate and Alkoxy Cross-Linker)

A silicone rubber mixture is produced according to the formulation described in Comparative Example 13, wherein 4.0 g of potassium(2-ethylhexanoate) are used as catalyst instead of 4.0 g of lithium(2-ethylhexanoate).
The sealant exhibits after exposure to air:
a skin formation time of 5 min
a tack free time of 30 min
a complete cure after 24 h (notch strength)
a transparent appearance
a Shore-hardness A of 16
Moreover, it was found that the sealant only has a moderate adhesion to wood, varnished wood, glazed wood, aluminium, powder-coated aluminium, glass, PVC, polyamide, steel, concrete, and many other materials.
Further, the sealant has an insufficient storage stability within the cartridge. Already after 4 weeks of storage at 60° C. within the cartridge, no complete cure occurs any more. Accordingly, no adhesion to substrates is observed.
It is apparent from Comparative Examples 9 to 15 that it is not possible with the known tin-free catalysts to prepare a sealant material with acetate cross-linkers, which has good product properties, which would be comparable to those of a usual tin-containing sealant material (e.g. reference example 1). Particularly, the sealant materials prepared with the known tin-free catalysts have a bad adhesion to many materials as well as an incomplete cure. Moreover, these sealants exhibit an insufficient storage stability.

Example 9

Sealant Formulation 3 (with Acetate Cross-Linker)

A silicone rubber mixture is produced according to the following formulation:

| | |
|---|---|
| 562.0 g | of α,ω-dihydroxyl-terminated polydimethylsiloxane having a viscosity of 80000 cSt |
| 313.0 g | of polydimethylsiloxane having a viscosity of 100 cSt |
| 79.0 g | of highly disperse silicic acid (filler) |
| 40.0 g | of a cross-linker mixture of |
| | 28.0 g of propyl-triacetoxysilane and |
| | 12.0 g of methyl-triacetoxysilane |
| 5.0 g | of coupling agent (diacetoxy-di-tert.-butoxysilane) |
| 4.0 g | of Catalyst B (from Example 2) |

The sealant exhibits after exposure to air:
a skin formation time of 12 min
a tack free time of 25 min
an early strain after 40 min
a complete cure after 24 h (notch strength)
a transparent appearance
a Shore-hardness A of 15
Moreover, it was found that the sealant has a good adhesion to wood, varnished wood, glazed wood, aluminium, powder-coated aluminium, glass, PVC, polyamide, steel, concrete, and many other materials.
Further, the sealant is distinguished by its excellent storage stability within the cartridge. After 8 weeks of storage at 60° C. within the cartridge, the sealant still has the same properties as at the time of the first exposure.

Example 10

Sealant Formulation 4 (with Acetate and Alkoxy Cross-Linker)

A silicone rubber mixture is produced according to the following formulation:

| | |
|---|---|
| 555.0 g | of α,ω-dihydroxyl-terminated polydimethylsiloxane having a viscosity of 80000 cSt |
| 312.0 g | of polydimethylsiloxane having a viscosity of 100 cSt |
| 84.0 g | of highly disperse silicic acid (filler) |
| 45.0 g | of a cross-linker mixture of 31.5 g of methyl-triacetoxysilane, 9.0 g of propyl-triacetoxysilane and 4.5 g of methyl-trimethoxysilane |
| 2.5 g | of coupling agent (diacetocy-di-tert.-butoxysilane) |
| 4.0 g | of Catalyst B (from Example 2) |

The sealant exhibits after exposure to air:
a skin formation time of 15 min
a tack free time of 27 min
an early strain after 40 min
a complete cure after 24 h (notch strength)
a transparent appearance
a Shore-hardness A of 20

Moreover, it was found that the sealant has a good adhesion to wood, varnished wood, glazed wood, aluminium, powder-coated aluminium, glass, PVC, polyamide, steel, concrete, and many other materials.

Further, the sealant is distinguished by its excellent storage stability within the cartridge. After 8 weeks of storage at 60° C. within the cartridge, the sealant still has the same properties as at the time of the first exposure.

Example 11

Sealant Formulation 4 (with Acetate and Alkoxy Cross-Linker)

Four exemplary catalysts (B1 to B4) are produced from bismuth-tris(2-ethylhexanoate) and zinc-bis(2-ethylhexanoate). The mixing ratio (weight ratio) of bismuth-tris(2-ethylhexanoate) to zinc-bis(2-ethylhexanoate) is 4:1 in catalyst B1, 1:1 in catalyst B2, 2:1 in catalyst B3, and 1:4 in catalyst B4.

A silicone rubber mixture is produced according to the formulation described in Example 10, wherein 4.0 g of the catalysts B1, B2, B3, and B4 are added in each case instead of 4.0 g of catalyst B.

The sealant exhibits after exposure to air:
a skin formation time of 8 min (B1, B2, B3, B4)
a tack free time of 25 min (B1, B2, B3) or 45 min (B4), respectively
a complete cure after 24 h (notch strength) (B1, B2, B3, B4)
a transparent appearance
a Shore-hardness A of 20 (B2, B3, B4) or 21 (B1), respectively Moreover, it was found that the sealant has a good adhesion to wood, varnished wood, glazed wood, aluminium, powder-coated aluminium, glass, PVC, polyamide, steel, concrete, and many other materials.

Further, the sealant is distinguished by its excellent storage stability within the cartridge. After 8 weeks of storage at 60° C. within the cartridge, the sealant still has the same properties as at the time of the first exposure.

Example 12

Sealant Formulation 4 (with Acetate and Alkoxy Cross-Linker)

A silicone rubber mixture is produced according to the formulation described in Example 10, wherein 4.0 g of a catalyst made of bismuth-tris(2-ethylhexanoate) and sodium (2-ethylhexanoate) in the ratio of 2:1 are used instead of 4.0 g of catalyst B.

The sealant exhibits after exposure to air:
a skin formation time of 6 min
a tack free time of 23 min
a complete cure after 24 h (notch strength)
a transparent appearance
a Shore-hardness A of 17

Moreover, it was found that the sealant has a good adhesion to wood, varnished wood, glazed wood, aluminium, powder-coated aluminium, glass, PVC, polyamide, steel, concrete, and many other materials.

Example 13

Sealant Formulation 4 (with Acetate and Alkoxy Cross-Linker)

A silicone rubber mixture is produced according to the formulation described in Example 10, wherein 4.0 g of a catalyst made of bismuth-tris(2-ethylhexanoate) and calcium-bis(2-ethylhexanoate) in the ratio of 1:1 are used instead of 4.0 g of catalyst B.

The sealant exhibits after exposure to air:
a skin formation time of 7 min
a tack free time of 32 min
a complete cure after 24 h (notch strength)
a transparent appearance
a Shore-hardness A of 17

Moreover, it was found that the sealant has a good adhesion to wood, varnished wood, glazed wood, aluminium, powder-coated aluminium, glass, PVC, polyamide, steel, concrete, and many other materials.

In contrast to the sealants produced in the Comparative Examples 9 to 15, the sealants with acetate cross-linkers or acetate and alkoxy cross-linkers, respectively, prepared with the catalyst according to the invention of Examples 9 to 13 are not only distinguished by excellent product properties, but also by an excellent storage stability. The advantageous effect of the catalyst according to the invention is independent of the composition used, the mixing ratio, and the cross-linkers used. An especially advantageous catalyst comprises bismuth-tris(2-ethylhexanoate) and zinc-bis(2-ethylhexanoate). In particular, it was found that the catalyst B causes especially good properties in the produced sealants, particularly in combination with acetate cross-linkers.

Moreover, an additional co-catalyst is not required.

The invention claimed is:

1. A composition, comprising
at least one organosilicone compound,
at least one cross-linker, and
a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carboxylic acids having six to nineteen carbon atoms.

2. A composition, according to claim 1, wherein the ratio of the number of zinc atoms of the zinc salt of a carboxylic acid to the number of the metal atoms of the metal salt of a carboxylic acid is from 2:1 to 1:2.

3. A composition, according to claim 1, wherein at least one metal salt of a carboxylic acid, which is selected from the group consisting of bismuth-tris(2-ethylhexanoate), Calcium-bis(2-ethylhexanoate), sodium(2-ethylhexanoate), and zinc-bis(2-ethylhexanoate).

4. A composition, according to claim 1, comprising calcium-bis(2-ethylhexanoate) and zinc-bis(2-ethylhexanoate).

5. A composition, according to claim 1, comprising bismuth-tris(2-ethylhexanoate) and zinc-bis(2-ethylhexanoate).

6. A composition, according to claim 1, comprising sodium(2-ethylhexanoate) and zinc-bis(2-ethylhexanoate).

7. A composition, according to claim 1, wherein the organosilicone compound comprises an α,ω-dihydroxyl-terminated polydialkylsiloxane.

8. A composition, according to claim 1, wherein the cross-linker comprises at least one compound, which is selected from the group consisting of silane compounds comprising acid residues, particularly silane compounds having acetate residues, and silane compounds comprising oxime residues, particularly silane compounds having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

9. A composition, according to claim 1, wherein the cross-linker comprises at least one silane compound having acetate residues and at least one silane compound having alkoxy residues.

10. A composition, according to claim 1, comprising 40 to 90% by weight of the organosilicone compound, 1 to 15% by weight of the cross-linker, and 0.1 to 5.0% by weight of the catalyst.

11. A method of using a composition comprising the steps of:
(a) providing a composition formed from the following steps:
providing t least one organosilicone compound;
providing at least one cross-linker, and
providing a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carboxylic acids having six to nineteen carbon atoms;
mixing the organosilicone compound, the cross-linker, and the catalyst to form a composition; and
(b) using the composition for the purpose selected from the group consisting of as a sealant, an adhesive and coating agent.

12. A method for cross-linking a silicone rubber material using a catalyst comprising the steps of:
providing a catalyst, wherein the catalyst comprises a metal salt of a carboxylic acid, which is a zinc salt of one or more branched saturated carboxylic acids having six to nineteen carbon atoms, and a metal salt of a carboxylic acid, which is selected from the group consisting of a bismuth salt, a calcium salt, a potassium salt, a lithium salt, a magnesium salt, and a sodium salt, each of one or more branched saturated carboxylic acids having six to nineteen carbon atoms, and
mixing an organosilicone compound, a cross-linker, and the catalyst to form a composition.

13. A method for cross-linking a silicone rubber material using a catalyst according to claim 12, wherein the ratio of the number of zinc atoms of the zinc salt of a carboxylic acid to the number of the metal atoms of the metal salt of a carboxylic acid is from 2:1 to 1:2.

14. A method for cross-linking a silicone rubber material using a catalyst according to claim 12, wherein the catalyst comprises at least one metal salt of a carboxylic acid, which is selected from bismuth-tris(2-ethylhexanoate), Calcium-bis(2-ethylhexanoate), sodium(2-ethylhexanoate), and zinc-bis(2-ethylhexanoate).

15. A method for cross-linking a silicone rubber material using a catalyst according to claim 12, wherein the catalyst comprises calcium-bis(2-ethylhexanoate) and zinc-bis(2-ethylhexanoate).

16. A method for cross-linking a silicone rubber material using a catalyst according to claim 12, wherein the catalyst comprises bismuth-tris(2-ethylhexanoate) and zinc-bis(2-ethylhexanoate).

17. A method for cross-linking a silicone rubber material using a catalyst according to claim 12, wherein the catalyst comprises sodium(2-ethylhexanoate) and zinc-bis(2-ethylhexanoate).

18. A method for cross-linking a silicone rubber material using a catalyst use according to claim 12, wherein the silicone rubber material comprises an α,ω-dihydroxyl-terminated polydialkylsiloxane.

19. A method for cross-linking a silicone rubber material using a catalyst according to claim 12, wherein the silicone rubber material comprises at least one cross-linker, wherein the cross-linker comprises at least one compound, which is selected from the group consisting of silane compounds comprising acid residues, particularly silane compounds having acetate residues, and silane compounds comprising oxime residues, particularly silane compounds having acetonoxime groups, silane compounds having methyl-ethyl-ketoxime groups, silane compounds having methyl-propyl-ketoxime groups, silane compounds having methyl-isobutyl-ketoxime groups and/or silane compounds having methyl-isopropyl-ketoxime groups.

20. A method for cross-linking a silicone rubber a using a catalyst according to claim 19, wherein the cross-linker comprises at least one slime compound having oxime residues, and the catalyst comprises zinc-bis(2-ethylhexanoate) and calcium-bis(2-ethylhexanoate).

21. A method for cross-linking a silicone rubber material using a catalyst according to claim 19, wherein the cross-linker comprises at least one silane compound having acetate residues and/or alkoxy residues, and the catalyst comprises zinc-bis(2-ethylhexanoate) and bismuth-tris(2-ethylhexanoate).

22. A method for cross-linking a silicone rubber material using a catalyst according to claim 12, wherein 01 to 5.0% by weight of the catalyst is used with 40 to 90% by weight of the organosilane compound and 1 to 15% by weight of the cross-linker.

* * * * *